(12) United States Patent
Schmid et al.

(10) Patent No.: US 8,924,274 B2
(45) Date of Patent: Dec. 30, 2014

(54) FOR AND METHOD OF PROVIDING PORTFOLIO RISK INFORMATION TO INVESTORS WITHOUT REVEALING POSITION INFORMATION

(75) Inventors: Brian Schmid, Brooklyn, NY (US);
Gregg E Berman, Plainsboro, NJ (US);
Pete Benson, Ann Arbor, MI (US)

(73) Assignee: Riskmetrics Solutions, LLC, New York, NY (US)

( * ) Notice: Subject to any disclaimer, the term of this patent is extended or adjusted under 35 U.S.C. 154(b) by 1013 days.

(21) Appl. No.: 12/331,919

(22) Filed: Dec. 10, 2008

(65) Prior Publication Data

US 2010/0145875 A1 Jun. 10, 2010

(51) Int. Cl.
*G06Q 40/00* (2012.01)
*G06Q 40/06* (2012.01)

(52) U.S. Cl.
CPC ..................... *G06Q 40/06* (2013.01)
USPC ...................................................... 705/36 R

(58) Field of Classification Search
CPC ...................................................... G06Q 40/06
USPC ...................................................... 705/36 R
See application file for complete search history.

(56) References Cited

U.S. PATENT DOCUMENTS

| | | | | |
|---|---|---|---|---|
| 6,058,377 | A * | 5/2000 | Traub et al. | 705/36 R |
| 7,324,971 | B2 * | 1/2008 | Bookstaber | 705/38 |
| 7,530,490 | B1 * | 5/2009 | Finkemeier et al. | 235/379 |
| 7,756,896 | B1 * | 7/2010 | Feingold | 707/791 |
| 7,937,316 | B2 * | 5/2011 | Friedman et al. | 705/37 |
| 2001/0011243 | A1 * | 8/2001 | Dembo et al. | 705/36 |
| 2002/0123951 | A1 * | 9/2002 | Olsen et al. | 705/36 |
| 2003/0061152 | A1 * | 3/2003 | De et al. | 705/38 |
| 2003/0172017 | A1 * | 9/2003 | Feingold et al. | 705/35 |
| 2003/0225706 | A1 * | 12/2003 | Bookstaber | 705/64 |
| 2004/0044505 | A1 * | 3/2004 | Horwitz | 703/3 |
| 2004/0064394 | A1 | 4/2004 | Wallman | |
| 2005/0021438 | A1 * | 1/2005 | Tezuka et al. | 705/36 |
| 2005/0027638 | A1 * | 2/2005 | Ng et al. | 705/37 |
| 2005/0086155 | A1 | 4/2005 | Villacorta et al. | |
| 2006/0080250 | A1 * | 4/2006 | Hansen et al. | 705/42 |
| 2006/0190378 | A1 | 8/2006 | Szydlo | |
| 2006/0277124 | A1 * | 12/2006 | Gerrietts, II | 705/35 |
| 2007/0244777 | A1 * | 10/2007 | Torre et al. | 705/35 |
| 2008/0005002 | A1 * | 1/2008 | Ferris | 705/36 R |
| 2008/0154792 | A1 | 6/2008 | Maggioncalda et al. | |
| 2009/0043713 | A1 * | 2/2009 | Weber et al. | 705/36 R |
| 2010/0235300 | A1 * | 9/2010 | Feingold | 705/36 R |
| 2012/0254068 | A1 * | 10/2012 | Weber et al. | 705/36 R |

OTHER PUBLICATIONS

RiskMetrics, Examples of RiskManager in Use, Jun. 10, 2007, www.riskmetrics.com, Wayback Machine, all pages.*

(Continued)

*Primary Examiner* — Kenneth Bartley
(74) *Attorney, Agent, or Firm* — Hunton & Williams LLP

(57) ABSTRACT

A system for and method of providing investors with risk information regarding a portfolio, while protecting a strategy associated with the portfolio from public disclosure, is presented. The information allows investors to calculate a variety of risk statistics at virtually any level of granularity in analyzing divisions of the portfolio. The system and method also provide benefits for portfolio managers. Specifically, a portfolio manager may release detailed simulated returns, from which investors may calculate a variety of risk statistics, without revealing position information sufficient for the investors to reverse engineer a strategy associated with the portfolio.

21 Claims, 9 Drawing Sheets

(56) References Cited

OTHER PUBLICATIONS

RiskMetrics, Standard Reporting, Oct. 16, 2006, www.riskmetrics.com, Wayback Machine, all pages.*

RiskMetrics Group, "Portfolio Pilot User Guide," Jul. 24, 2008, www.riskmetrics.com, all pages.*

RiskMetrics, Importing Portfolios with RWS, Feb. 5, 2008, www.riskmetrics.com, all pages.*

United States Securities and Exchange Commission, "Form S-1, RiskMetrics Group, Inc.," Nov. 30, 2007, pp. 1-131.*

RiskMetrics Group, "Portfolio Pilot: building a bridge between portfolio and risk managers," Jun. 10, 2007, pp. 1-16.*

Euromoney Magazine, Risk Management: As easy as ASP, Feb. 1, 2001, pp. 1-9.*

International Search Report and Written Opinion both mailed Jan. 21, 2010 for International Application No. PCT/US09/67373.

* cited by examiner

```
┌──────────────────────────────────────────────────────────────────────────┐
│ 🅿 RiskManager Editor – Microsoft Internet Explorer              _ □ ✕  │
├──────────────────────────────────────────────────────────────────────────┤
│ ⊟ Generic Bond                                                           │
│         Position Name [Aramark TL B L+187.5  01-26-14] ──── 302          │
│            Permission [Private▼] ← 304                                   │
│  306 ──── Currency [USD▼]                                                │
│              Notional [2.0E7                     ] ──── 308              │
│         Notional Date ☑  ⊟ Notional Date                                 │
│  310 ──►        Explicit Date ☑ [5/30/2008] 📅                           │
│                 Constant Term ☐ [         ] [Day(s)▼]                    │
│     Redemption Value ☐ [                    ]                            │
│           Bond Price ☐ [                    ]              300           │
│      Accrued Interest ☐ [                    ]                           │
│     Clean Dirty Price ☑ [clean▼]                                         │
│            Trade Flat ☐                                                  │
│       Settlement Date ☐ ⊟ Settlement Date                                │
│  312 ──►        Explicit Date ☐ [         ] 📅                           │
│                 Constant Term ☐ [         ] [Day(s)▼]                    │
│            Value Date ☐ ⊟ Value Date                                     │
│  314 ──►        Explicit Date ☐ [         ] 📅                           │
│                 Constant Term ☐ [         ] [Day(s)▼]                    │
│      Settlement Price ☐ [                    ]                           │
│    Accrued Interest For                                                  │
│           Settlement ☐ [                    ]                            │
│    Settlement Period ☑ [7B                   ]                           │
│            Issue Date ☐ ⊟ Issue Date                                     │
│  316 ──►        Explicit Date ☐ [         ] 📅                           │
│                 Constant Term ☐ [         ] [Day(s)▼]                    │
│           Issue Price ☐ [                    ]                           │
│  318 ─Discount Curve ⊞ Discount Curve                                    │
│                      [US USD Retail Trade Leveraged Loans]               │
│       Riskless Curve ☑ ⊞ Riskless Curve                                  │
│  320 ──►             [USD Swap                    ]                      │
│      Discount Spread ☐ [                    ]                            │
│ Discount Curve Spread                                                    │
│     Calibration Limit ☐ [                    ]                           │
│         Maturity Date ☑ ⊟ Maturity Date                                  │
│  322 ──►        Explicit Date ☐ [         ] 📅                           │
│                 Constant Term ☑ [3        ] [Day(s)▼]                    │
│           Dated Date ☐ ⊟ Dated Date                                      │
│  324 ──►   326  Explicit Date ☐ [         ] 📅                           │
│              ↘  Constant Term ☐ [         ] [Day(s)▼]                    │
│  First or Next Coupon ☑ ⊟ First or Next Coupon Date                      │
│                   Date                                                   │
│                 Explicit Date ☑ [7/26/2008] 📅                           │
└──────────────────────────────────────────────────────────────────────────┘
```

Fig. 3A

| RiskManager Editor – Microsoft Internet Explorer | |
|---|---|
| First or Next Coupon Date ☑ | Constant Term ☐ [ ] Day(s) ▼ |
| | ⊟ First or Next Coupon Date |
| 326 → | Explicit Date ☑ 7/26/2008 📅 |
| | Constant Term ☐ [ ] Day(s) ▼ |
| Last Coupon Date Before Maturity ☐ | ⊟ Last Coupon Date Before Maturity |
| 328 → | Explicit Date ☐ [ ] 📅 |
| | Constant Term ☐ [ ] Day(s) ▼ |
| Coupon Type | floatCoupon ▼ |
| Is Zero Coupon Flag ☐ | |
| End of Month Rule ☐ | |
| No Leap Days Flag ☐ | |
| Business Day Rule ☐ | [ ] ▼ |
| Holiday List Name ☐ | [ ] |
| Fixed Interest Basis ☐ | ⊟ Fixed Interest Basis |
| 330 → Coupon Frequency ☐ | [ ] ▼ |
| Coupon Rate | [ ] |
| Coupon Amount Method ☐ | [ ] ▼ |
| First Fixed Coupon Date ☐ | ⊞ First Fixed Coupon Date |
| Last Fixed Coupon Date ☐ | ⊞ Last Fixed Coupon Date |
| Day Count Convention ☐ | [ ] ▼ |
| Floating Interest Basis ☑ | ⊟ Floating Interest Basis |
| Coupon Frequency ☑ | quarterly ▼ |
| 332 → Reference Curve | ⊞ Reference Curve |
| | USD Swap |
| Reference Toner ☐ | [ ] Day(s) ▼ |
| Reference Frequency ☐ | [ ] ▼ |
| Reset Frequency ☐ | [ ] ▼ |
| Float Multiple ☐ | [ ] |
| Float Offset ☑ | 200.0 |
| Spread Step List ☐ | ⊞ Spread Step List |
| Maximum Rate ☐ | [ ] |
| Minimum Rate ☐ | [ ] |
| In Arrears ☐ | |
| Current Rate ☐ | [ ] |
| Accrued Coupon ☐ | |
| Annualize Exponentially ☐ | |
| First Floating Coupon Date ☐ | ⊞ First Floating Coupon Date |
| 334 → Last Floating Coupon Date ☐ | ⊞ Last Floating Coupon Date |
| Day Count Convention ☑ | dayCount_Act_360 ▼ |
| Step Coupon Basis ☐ | ⊟ Step Coupon Basis |

Fig. 3B

```
┌─────────────────────────────────────────────────────────────────────────┐
│ 🅿 RiskManager Editor – Microsoft Internet Explorer           _ □ ×     │
├─────────────────────────────────────────────────────────────────────────┤
│              Is Interest Multiplier Bond ☐                              │
│               Day Count Convention ☐ [        ▼]                        │
│  Sinking Fund and ┌─────────────────────────────────────────────────┐   │
│  Amortization ☑   │ ⊟ Sinking Fund and Amortization Specification   │   │
│  Specification    │   Sink Schedule ☑  ⊞ Sink Schedule Explicit Date: (Explicit date: (Explicit Date = │
│       ↗           │                       20070331), Sink Amount...  │  │
│  336              │         Is Par Sink ☑                            │  │
│            Is Market Purchasable Flag ☐                                 │
│               Sinking Fund Prices ☐  ⊞ Sinking Fund Prices              │
│                  Prepay Speed ☐     ⊞ Prepay Speed                      │
│  Is Interest Only ☐                                                     │
│  Call Provisions ☐  ⊟ Call Provisions                                   │
│                       ⊞ Option Schedule                                 │
│       ↗              Last Strikable Date ☐  ⊞ Last Strikable Date       │
│  338                 Discrete Strike Flag ☐                             │
│                           Days Notice ☐ [            ]                  │
│                            Partial calls ☐                              │
│  Put Provisions ☐  ⊟ Put Provisions                                     │
│                       ⊞ Option Schedule                                 │
│       ↗              Last Strikable Date ☐  ⊞ Last Strikable Date       │
│  340                 Discrete Strike Flag ☐                             │
│                           Days Notice ☐ [            ]                  │
│  Announced                                                              │
│  Redemptions ☐  ⊟ Announced Redemptions                                 │
│                           Call Price ☐ [            ]                   │
│                           Call Date ☐  ⊞ Call Date                      │
│       ↗               Called Amount ☐ [            ]                    │
│  342                        Put Price ☐ [            ]                  │
│                           Put Date ☐   ⊞ Put Date                       │
│                         Put Amount ☐ [            ]                     │
│  Brady Bond Specifics ☐  ⊟ Brady Bond Specifics                         │
│       ↗       Is Principal Collateralized ☐                             │
│  344         Rolling Interest Guarantee [        ]                      │
│              Last Guarantee Date ☐  ⊞ Last Guarantee Date               │
│  Inflation Indexed Bond ⊟ Inflation Indexed Bond Specifics              │
│       Specifics ☐                                                       │
│              Break Even Inflation  ⊞ Break Even Inflation Curve         │
│                           Curve [                ]                      │
│       ↗          Reference Index [    ▼]                                │
│  346                        Lag ☐ [            ]                        │
│              Interpolation Method ☐ [  ▼]                               │
│              Current Index Projection                                   │
│                        Details ☐ [    ▼]                                │
└─────────────────────────────────────────────────────────────────────────┘
```

Fig. 3C

RiskManager Editor – Microsoft Internet Explorer

□ Credit Default Swap

- Position Name: AMR 6/20/09 CDS — 405
- 410 — Permission: Private
- Notional: 20000000 — 415
- 420 — Currency: USD
- Spread: 2656.4
- Fair Spread ☐
- Market Price ☐
- Dirty Price ☐       ← 425
- Spread Frequency ☐
- Protection Side Type ☑ buyer
- Bond Coupon ☐       ← 430
- Discount Curve ☐
- Maturity Date: 6/20/2009
- Settlement Date ☐
- Settlement Price ☐
- Pricing Model Type ☐    ← 435
- Bond Spread Curve Model Inputs ☐
- CDS Spread Curve Model Inputs ☐
- Credit Grade Model Inputs ☑   □ Credit Grade Model Inputs
  - Bond Recovery Rate ☐        Equity Name: (,)
  - Equity Name    ⊞ Equity Name
  - 440            NYSE – Amr Corp
                   ident-type
                   exchange
  - Beta ☐
  - equityReturnBooster ☐
  - Underlying Equity Price ☐
  - Equity Currency ☐
  - Proxy name ☐
  - Proxy beta ☐
  - Equity Volatility ☐
  - Debt Per Share ☐
  - Global Recovery Rate ☐
  - Default Barrier Standard Deviation ☐
- Accrued Premium ☐
- Yearly Amortization Rate ☐
- Notional is in arrears ☐
- Amortize during aging ☐
- Current factor ☐
- Issuer Name ☐

FOR AND METHOD OF PROVIDING PORTFOLIO RISK INFORMATION TO INVESTORS WITHOUT REVEALING POSITION INFORMATION

FIELD OF THE INVENTION

The present invention generally relates to a computer-implemented technique for calculating and providing to investors statistical risk information regarding a portfolio. The invention further relates to preventing investors from reverse engineering the portfolio's associated investment strategy.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which:

FIGS. 3A, 3B and 3C depict an exemplary bond position page according to an embodiment of the present invention;

FIG. 4 depicts an exemplary credit default swap position page according to an embodiment of the present invention;

FIG. 5 depicts an exemplary Monte Carlo parameter input page;

FIG. 6 depicts simulated returns produced by a portion of a Monte Carlo simulation according to an embodiment of the present invention.

DETAILED DESCRIPTION OF EMBODIMENTS

Figure 1:
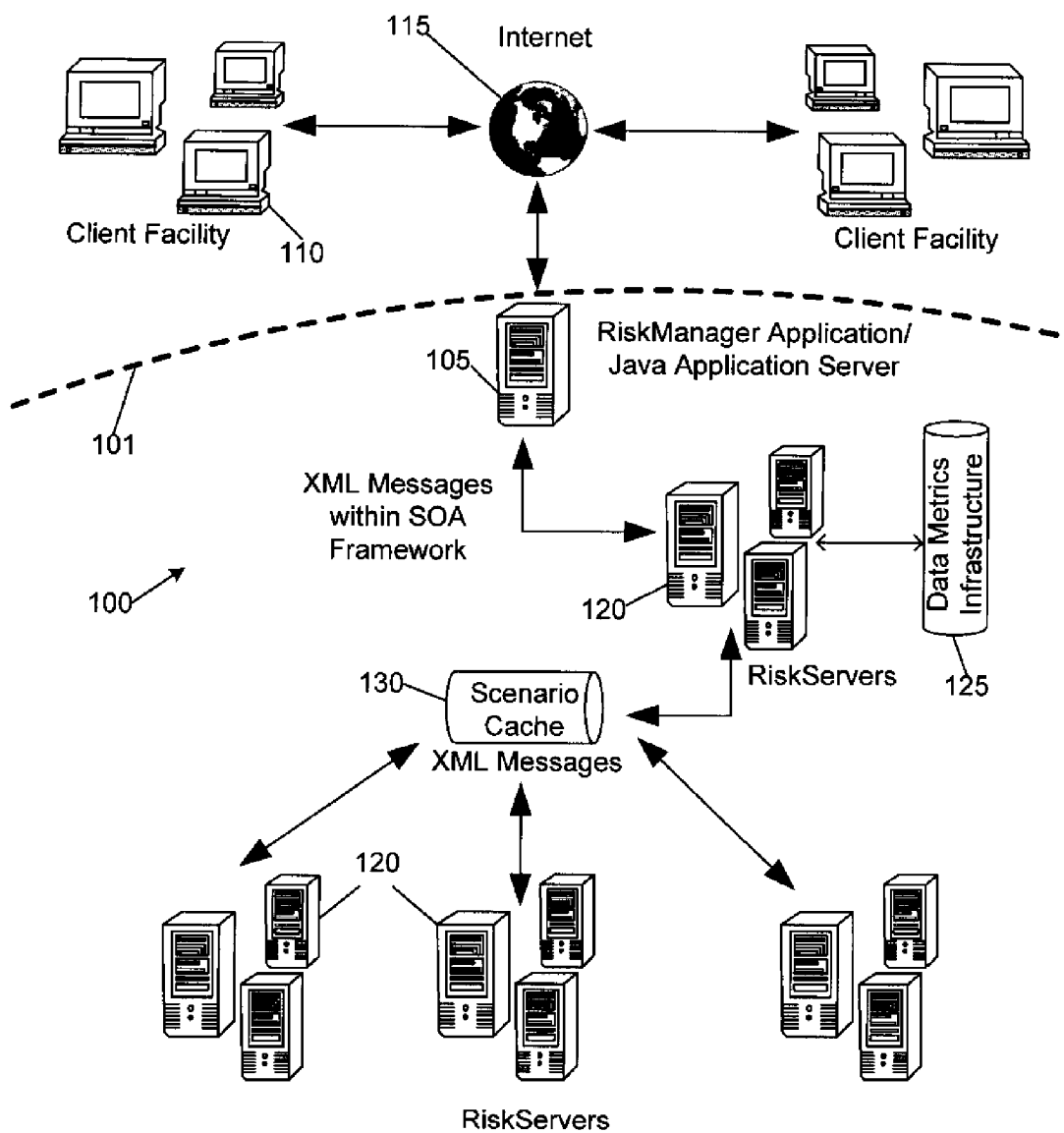
FIG. 1 is a schematic diagram of a system according to an embodiment of the present invention.

Certain embodiments of the present invention provide benefits to both investors and portfolio managers. Certain embodiments of the present invention provide investors with detailed risk information regarding an investment portfolio, without revealing the underlying positions of the portfolio or the associated investment strategy. In particular, certain embodiments of the present invention provide to investors simulated returns and the mathematical models and analytical framework used to generate the simulated returns, including any utilized risk factors and scenarios. Such embodiments further provide investors with access to analytics engines, which the investors may direct to calculate a variety of risk statistics using the provided information. Importantly, portfolio managers need not provide to investors any portfolio position information, yet the investors may calculate a variety of detailed risk statistics. In some embodiments, portfolio position information never leaves the control of the portfolio mangers and is thus never made available to any third party (such as investors), yet the investors may calculate detailed risk statistics as if they had full access to detailed position information. Portfolio managers benefit by being able to provide investors with detailed risk information without having to reveal portfolio position information or portfolio strategy information.

A portfolio according to an embodiment of the invention may include, by way of non-limiting example, any, or a combination, of hedge fund shares from one or more hedge funds, mutual fund shares from one or more mutual funds, equities (e.g., stocks), debts (e.g., corporate bonds, treasuries) and derivatives (e.g., options, puts, calls, futures).

A portfolio may be managed by one or more portfolio managers (e.g., one manager for each fund having shares in the portfolio). Portfolio managers (herein, "managers") are generally responsible for making strategic investment decisions for the portfolio or a portion thereof. In particular, the managers select and change investment positions on an ongoing basis. As used herein, the term "position" means the contents of the portfolio, typically expressed in terms of the smallest unit that may be invested in. A position may include long and short positions, such as open contracts to buy financial instruments for addition to the portfolio (e.g., calls) and open contracts to sell financial instruments currently in the portfolio (e.g., puts).

Managers typically employ particular strategies in managing their portfolios, e.g., for changing and maintaining portfolio positions. Different strategies may focus on different aspects of a portfolio. For example, strategies may focus on the type of instrument in the portfolio (e.g., equities, fixed income instruments, futures, options) or the sector of the instruments in the portfolio (e.g., health care, emerging market, high technology). Other strategies may employ specific quantitative methods to determine whether the asking prices of certain instruments are below the actual value of such instruments. As a specific example, one strategy is to populate the portfolio with European put and call options, purchased only when the asking price is below a price calculated using an options pricing formula such as the celebrated Black-Scholes formula. This strategy may involve exercising the options when in the money on the strike date. Note that, in general, a single portfolio may have one or more than one associated strategy (e.g., a different strategy for each fund in the portfolio). Accordingly, throughout this disclosure the term "strategy" embraces both the singular and the plural.

In general, portfolio strategies are closely guarded trade secrets, in that their details are not revealed, and in that they derive independent economic value from not being generally known. However, successful portfolios tend to attract attention, and with that attention, attempts to determine the portfolio's strategy. Thus, competing managers may attempt to determine the strategy behind successful portfolios and use such information to their advantage (e.g., by implementing the strategy in their own portfolio). Attempts to deduce a portfolio's strategy may proceed by reverse engineering the strategy from position information of the portfolio. That is, knowledge of a portfolio's current and historical position information may be sufficient to determine the portfolio's associated strategy. Accordingly, managers tend to keep position information secret so that it cannot be used to derive the portfolio's strategy. In particular, investors generally do not know the position information of portfolios in which they invest or the specific strategy being implemented by the managers.

Note that general information regarding the contents of a portfolio, such as market segment, is not considered "position information" and does not rise to the level of a strategy. Thus, managers may reveal that their portfolio contains, for example, commodities, or that it contains indexes, or that it contains Asian blue chip stocks. These facts would not be considered position information and would not reveal the underlying strategy of the portfolio. "Position information," as that term finds meaning herein, refers to detailed information concerning changes in position sufficient to reverse engineer a portfolio's strategy. Likewise, "strategy," as that term finds meaning herein, refers to a technique for determining when and what changes to make in a portfolio's positions.

Investors are generally interested in knowing risk statistics regarding their investment portfolio. Such statistics include, by way of non-limiting example, value at risk ("VaR") and conditional value at risk ("C-VaR"), also known as "expected shortfall." Such statistics allow the investor to assess whether the investment is prudent in view of its returns, which are typically published, and its risks, which are reflected in the risk statistics themselves. Certain risk statistics may be calculated from portfolio position information. Managers generally have access to all information regarding a portfolio, including position information, from which they can derive risk statistics. Investors, on the other hand, generally do not know position information for the portfolio in which they invest. However, certain risk statistics may alternately be calculated without knowledge of position information. As discussed in detail below, certain risk statistics may be calculated using a plurality of simulated returns, from which a portfolio's strategy cannot be ascertained. Thus, certain embodiments of the present invention provide investors with information sufficient to calculate a variety of detailed risk statistics, without the information being sufficient to deduce the portfolio's associated strategy.

Monte Carlo simulations may be used to generate risk and other statistics regarding a portfolio. In general, a Monte Carlo simulation repeatedly utilizes a mathematical model, which accepts a plurality of inputs and computes an output. As used herein, all "mathematical models" are computer implemented. One of the inputs to the mathematical model is a random variable. Thus, Monte Carlo simulations further utilize a source of randomness such as a list of random numbers, a random number generator or a pseudorandom number generator. A Monte Carlo simulation may proceed by inputting a set of input parameters including a random number to the mathematical model, which proceeds to calculate an output. The process of inputting a set of parameters is repeated multiple times (e.g., tens of times, hundreds of times, thousands of times, ten-thousands of times, hundred-thousands of times), each time with a different random or pseudorandom number, and each output from the mathematical model is recorded. The set of outputs may then be processed to compute a result. Such process may include, for example, calculating an average of all outputs.

The mathematical model used in a Monte Carlo simulation may output a predicted value of a portfolio on a future specified date, assuming a particular set of market conditions as inputs to the model. If multiple dates are selected, the model may output a time series. (In general, the term "time series" refers to a collection of parameters indexed by time, such as date. Time series may be used as inputs to mathematical models, and may be output from a mathematical model.) The real or hypothetical market conditions input to a mathematical model as well as its output are referred to herein as a market scenario, or simply "scenario." Note that scenarios may include simulated, hypothetical or actual historical data, predicted future data, or combinations thereof. Thus, a mathematical model may accept as inputs a set of hypothetical market conditions and a random number (the inputs to the model), and output a predicted value of the portfolio on the specified date under the specified market conditions. By way of non-limiting example, the random number may be transformed to a random London Inter-Bank Offered Rate ("LIBOR") interest rate (an internationally-recognized baseline interest rate) which affects a large variety of market parameters. This transformation may be accomplished, by way of non-limiting example, by multiplying the random number by a selected baseline LIBOR rate.

A simulated return (also called a simulated profit and loss, or "simulated P&L") reflects a simulated profit or loss of a portfolio or portion thereof. Simulated returns may be expressed as a difference between a value of a portfolio (or portion thereof) according to a baseline market scenario and a predicted value of the portfolio (or portion thereof) according to a different market scenario sometime in the future. This latter quantity may be computed using a mathematical model as discussed above. Thus, a difference between the predicted value and the baseline value represents a simulated return. Alternately, simulated returns may be expressed as an absolute value of a portfolio as predicted on one or more future dates. Note that a simulated return may be expressed as a percentage, an absolute currency amount, or in terms of basis points. In short, a simulated return provides a predicted amount of the value of a portfolio (or portion thereof) sometime in the future, whether the simulated return is expressed as a difference, an absolute currency value, a percentage or in terms of basis points.

A portion of a Monte Carlo simulation may be used to repeatedly compute predicted portfolio values under a number of different scenarios. Thus, a portion of a Monte Carlo simulation may be used to generate a plurality of simulated returns. Note that the portion of the Monte Carlo simulation need not be a complete Monte Carlo simulation in that it need not produce a final result from the simulated returns. That is, a Monte Carlo simulation, excluding a computation of a final result, may be used to generate a plurality of simulated returns. The scenarios, simulated returns, and the model used to generate the simulated returns are made available to investors as discussed in detail elsewhere herein. Investors may then use the simulated returns to calculate a variety of risk parameters, such as VaR.

Importantly, it is generally impossible to determine a portfolio's positions from knowledge of its simulated returns. That is, an investor armed with complete knowledge of the mathematical model used to generate a set of simulated returns together with a full set of simulated returns and their associated scenarios would not have enough information to deduce the portfolio's positions or its associated strategy.

Note that, in general, simulated returns may be calculated as follows. For a particular portfolio partition, risk factors may be identified. Risk factors include, by way of non-limiting example, time series representing: equity prices, foreign exchange spot rates (e.g., in the form of prices of unit amounts of foreign currencies), commodity spot and futures prices, and interest rates (e.g., in the form of prices of zero coupon bonds). Risk factors may be thought of as financial primitives, as discussed in Jorge Mina and Jerry Yi Xiao, *Return to RiskMetrics: The Evolution of a Standard,* RiskMetrics Group, April 2001, in that virtually any financial instrument may be modeled using a small set of risk factors. Once the risk factors for a particular portfolio partition are identified, the risk factors may be passed through a mathematic model in a portion of a Monte Carlo simulation, as discussed above, in order to predict future values (e.g., in order to extend the existing time series into the future). The extended risk factors may then be used to calculate simulated returns for the associated portfolio parts. This process is discussed in detail in the above-referenced article of Mina and Xiao. Thus, the simulated returns may be calculated on the level of portfolio parts or on the level of risk factors. Note that the risk factor definitions and the analytical framework from within which they may be used to calculate simulated returns may be made available to investors as discussed herein.

Certain embodiments of the present invention provide investors access to detailed simulated returns without revealing information sufficient to determine the portfolio positions or its associated strategy. Such embodiments may allow managers to input into a programmed computer position and other information regarding their portfolio. The system may use this information, together with market data, predicted market data, random numbers and possibly risk factors to perform a portion of a Monte Carlo simulation and generate simulated returns. The system makes the simulated returns available to the investors via, for example, a website. The system also makes the mathematical model used to calculate the simulated returns available to the investors in the same manner. The system also makes available the definitions of any risk factors and how they may be used to calculate the simulated returns available to the investors in the same manner. The system may make none, some, or all of the scenario input data available to the investors in the same manner. In some embodiments, all of the input information is made available, including the random number values. In such embodiments, the random number values may be made available outright (e.g., as a computer-readable list or a flat file), or the technique used to generate them may be made available (e.g., by specifying a pseudorandom number generator and a seed value). In some embodiments, the input information, excluding for the random numbers, may be made available to the investors. In such embodiments, statistical information regarding the random numbers may be made available to investors, such as, by way of non-limiting example: mean, variance, standard deviation, and distribution type (e.g., normal, uniform, etc.). Thus, in some embodiments, all analytical framework and parameters used to calculate the simulated returns (except portfolio position information) may be made available to investors via, for example, a website.

Note that simulated returns may be calculated for an entire portfolio, at the level of an individual instrument in the portfolio, or an any level of granularity in between. By way of non-limiting example, simulated returns may be calculated for portions of a portfolio according to asset class (e.g., equities, fixed income instruments, futures, options) or sector (e.g., health care, emerging market, high technology). That is, the portfolio may be partitioned according to various criteria (e.g., asset class or sector), and simulated returns may be calculated for each part. Note that some embodiments prevent investors from gaining portfolio position information. Such embodiments may prevent investors from accessing simulated returns for single holdings (e.g., a single type of stock). Some embodiments only calculate simulated returns for partitions in which each part has a minimum of two different holdings. Some embodiments only calculate simulated returns for partitions from which the portfolio's strategy cannot be reverse engineered. Note that partitions along asset class or sector are exemplary only. Other partitions may be used. In some embodiments, the investors may choose the partitions for which simulated returns are calculated. In some embodiments, investors may choose the partitions for which simulated returns are calculated, within constraints pre-specified by managers. Note also that the simulated returns referred to herein as being calculated may be made available to investors and managers as discussed herein.

In some embodiments, the managers decide what types of information the investors may access. In such embodiments, the managers direct the system to calculate, store and make available to investors a variety of simulated returns. The managers may choose to calculate, store and make available to investors simulated returns calculated for a variety of portfolio partitions, such as simulated returns for particular asset classes, particular sectors, and any other parameter that may be used to divide the portfolio. In some embodiments, the managers direct the system to limit the types of calculations that the investors may direct the system to perform. In such embodiments, for example, the managers may configure the system to limit the types of simulated returns that the investors may request be calculated. The managers may thus place restrictions on, for example, the types of portfolio partitions for which investors may request simulated returns be calculated.

The simulated returns provided to investors allow them to calculate risk statistics for the respective portfolio. Such statistics may cover all asset classes and all types of market risk, and include equity prices, commodity prices and curves, exchange rates, interest rate curves, and credit spread curves, together with implied volatility surfaces for multiple asset types. As an example, the simulated returns may be averaged (within each date) to yield a predicted portfolio value on that date. This predicted future value may be further processed to calculate an estimated present value of the portfolio. As another example, for a ten-year treasury bond, investors may calculate risk statistics such as points on the corresponding treasury curve up to ten years out. For an equity option, investors may calculate risk statistics such as equity price, discount curve, and, if specified, the implied volatility. As yet another example, the simulated returns may be used to compute a VaR as discussed elsewhere herein or according to techniques known to those of ordinary skill in the art. Investors may calculate these and other risk statistics from simulated returns provided by embodiments of the present invention.

It is important to note that calculating risk statistics from simulated returns according to certain embodiments of the present invention produces the same results as if the same risk statistics were calculated from position information. However, as discussed herein, investors cannot deduce a portfolio strategy from simulated returns, whereas an investor may be able to do so using position information. Accordingly, certain embodiments allow an investor to calculate risk statistics as if the investor had full access to position information, without actually providing such risk information to the investor. Instead, such embodiments provide simulated returns, from which investors may calculate the same risk statistics.

Note that many risk statistics are aggregatable. A risk statistic is aggregatable if it can be computed for a portfolio portion if its values for disjoint sub-portions are known. An example of a (non-risk) aggregatable quantity is portfolio value. If the values of each disjoint sub-portion of a portfolio are known, then the value of the entire portfolio may be determined. Other aggregatable quantities include, by way of non-limiting example: accrued interest, beta, delta, delta equivalents, stress test present value delta, bond equivalents, break-even inflation, clean present value, modified convexity, credit grade asset volatility, credit spread, discrete real yield, diversification benefit, dollar delta, dollar total gamma, duration, effective convexity, factor loadings, factor loadings contributions, factor loading statistical significance, factor R-squared, future value, exposure, generalized present value of basis point, Greek sensitivities, idiosyncratic option-adjusted spread, issuer option-adjusted spread, marginal risk grade, marginal standard deviation, market cap weighted risk grade, maximum credit exposure, mixed portfolio risk attribution, notional, par-yield sensitivity, position count, present value, recovery rate, risk attribution present value, risk grade, shortfall probability, spread convexity, spread duration, standard deviation, standard deviation of credit exposure and yield.

However, many risk statistics are non-aggregatable. For such non-aggregatable statistics, knowledge of their value for portions of a portfolio cannot be used to compute their values for an entire portfolio. Examples of such statistics include, by way of non-limiting example: base credit exposure, collateralized debt obligation correlation, conditional mean gains, portfolio correlation, credit exposure, expected credit exposure, expected shortfall, fixed income risk attribution, mixed portfolio risk attribution, risk attribution, VaR, incremental VaR, marginal VaR, risk attribution and risk contribution. Certain embodiments of the present invention allow investors to receive simulated returns, which the investors may use to calculate non-aggregatable risk statistics.

FIG. 1 is a schematic diagram of a system 100 according to an embodiment of the present invention. The components of system 100 (that is, the components below dotted line 101) work together to provide a multi-tiered client-server application with a browser-based front end located at the investors' or managers' premises. Thus, system 100 may function as an application service provider ("ASP"). Note that system 100 may be run, owned, and maintained by a third party, i.e., neither investors nor managers. The analytics portion of the system and the hardware on which it runs may be located remotely from the user site. (The term "user" is used herein to refer to both investors and managers.) Users may access the full interactive functionality of the system over a network such as the internet using a web browser. Through this web interface, managers can create and edit positions, and investors can request complex reports, stress tests, market data, simulated returns and risk statistics. User requests are processed remotely by system 100. The requests processed by system 100 may be in an open XML schema used for risk processing transactions. The XML requests can support the full range of analytics supported by system 100.

Note that system 100 architecture may be distributed across one or more computers (e.g., 105, 120). This enables scalability of performance of system 100. Adding additional rack-mounted servers to the ASP architecture of system 100 increases the risk processing throughput of system 100 transparently, with no interruption to the service.

Component software of system 100 may be written according to Java 2 Enterprise Edition ("J2EE"). In general, J2EE applications may be written in the Java programming language and packaged to run on J2EE-compliant application server hardware. With a J2EE application, the program calls may be made to a service-oriented architecture ("SOA") framework. The SOA framework provides a set of modular services choreographed into composite applications. The composite applications define business processes that span a set of services and provide results to another service, system or the user interface. Services used by system 100 may be true web services, communicating via simple object architecture protocol ("SOAP") XML messages using Java Messaging Services.

The SOA architecture provides for dynamic content being presented to the user's web browser executing on the user's facilities 110. This application architecture allows users to access system 100 from virtually any location, as long as they have access to the network 115 through a web browser. In some embodiments, users are expected to have a web browser installed on their respective hardware 110 in order to access the full functionality of system 100 over the network 115. In some embodiments, no further local installation or configuration beyond browser installation is required by the users. As detailed below, in some embodiments, managers may have input software installed on hardware controlled by such managers.

System 100 includes an application server 105, which provides data to investors and collects data from managers. The software portion of application server 105 may be written in Java and utilize a Java server pages ("JSP") framework to serve web pages to investors and managers via their web browsers. Application server 105 hardware runs the Java program code, presenting functionality to the user via a network such as the internet 115 on a web browser executing on the investors' or managers' hardware 110. System 100 allows investors to design and obtain reports and run risk analyses, and allows managers to do the same and to explore portfolios and enter positions. More particularly, system 100 allows investors to access, via application server 105, simulated returns, mathematical model definitions, risk factor definitions, and the analytical framework that is used to calculate the simulated returns.

Note that according to the embodiment of FIG. 1, application server 105 provides to remote users screens that present complex analytical information. This contrasts with a traditional desktop application, where program code is packaged to run on the investor's operating system 110. (However, some embodiments of the present invention include this latter approach.) The application functionality may be presented to the user in dedicated graphical user interfaces which may be generated by direct program calls to the operating system's application programming interface ("API").

System 100 further includes one or more analytics servers 120, which process input information from which they calculate simulated returns and risk statistics. That is, application server 105 may not itself calculate any risk statistics. Instead, such calculations may be handled by analytics servers 120, which provide a service within the SOA framework. The backend analytics (e.g., hosted on analytics servers 120) may be written in C++ and be made available as a 64-bit application, allowing the system 100 to handle truly large analyses. The analytics servers 120 may include multiple analysis engines, which execute investor queries and return the results for formatting and display at investors' facilities 110. In particular, investors may request simulated returns at any level of granularity. Further, investors may request that the analytics engines perform complex calculations of aggregatable and non-aggregatable risk statistics utilizing simulated returns and report their results to the investors. Thus, analytics servers 120 provide risk analysis services to users via application server 105.

Note that in some embodiments, one or more analytics servers are controlled and protected by managers. In such embodiments, such analytics servers may be secured such that they cannot be accessed by anyone without manager approval. In such embodiments, the analytics servers may have no network connection to other computer systems. That is, such servers may be located in a secure facility. Embodiments in which a manger secures its own analytics servers have at least one advantage. Specifically, managers may calculate simulated returns on-premises, without position information ever leaving the manager's control. That is, such embodiments allow managers to supply simulated returns to system 100 without inputting such information via application server 105. Instead, in such embodiments, the managers may supply only simulated returns. Thus, such embodiments allow investors to utilize simulated returns to calculate a variety of risk statistics, without the position information ever leaving the managers' control, that is, without the position information ever leaving the managers' facility.

System 100 further includes a market data store 125. Store 125 may communicate directly with analytics servers 120. Store 125 may be in the form of a database, a flat file, or any other format. Store 125 contains current and past market data, including, by way of non-limiting example, time series of market prices, interest rates and implied volatilities. By way of non-limiting example, store 125 may contain ten years of historical daily data for multiple markets in the following classes: foreign exchange rates (e.g., currency spot rates), yield curves (e.g., Canadian dollar 1-month, 3-month, and 1-year swap rates), credit curves (e.g., issuer specific and by rating or industry, CDS spread curves), equity prices and index levels (e.g., Nippon Telephone and Telegraph, Cotation Assistee en Continu 40 ("CAC 40"), Intel, and IBM stock prices), implied volatility surfaces (e.g., FX, equity, interest rate) and commodity (e.g., physical commodity) futures (e.g., Interest rate futures). Users may view data for all time series in system 100. The time series data may be updated daily, hourly or continuously. Users may also import their own time series data. Once imported, user-defined data may be fully incorporated into subsequent volatility and correlation calculations. More particularly, store 125 is operatively coupled to analytics servers 120 such that analytics servers 120 may access market data without requiring manual transportation of data. The parameters of store 125 may be used to generate risk statistics as discussed herein.

System 100 further includes a scenario cache 130. Scenario cache 130 stores scenarios. Note that scenario cache 130 stores random numbers used as part of the scenarios, which may be used as random variables in, for example, Monte Carlo simulations. Thus, scenario cache 130 stores sets of random numbers, pseudorandom numbers, pseudorandom number generators, or pseudorandom number generators together with pseudorandom number generator seeds. Storing such parameters allows for Monte Carlo simulations (or portions thereof) according to embodiments of the present invention to be repeatable. That is, multiple simulations may utilize the same values for their random variables. Storage of such parameters also allows for the simulations to be deterministic, and the same inputs may be used in different simulations. This is particularly advantageous in calculating non-aggregatable risk statistics, as such statistics may be aggregatable only if they are calculated using the same values for their random variables. In some embodiments, scenario cache 130 also stores simulated returns; in other embodiments, simulated returns have a separate store, operatively coupled to system 100.

Figure 2:
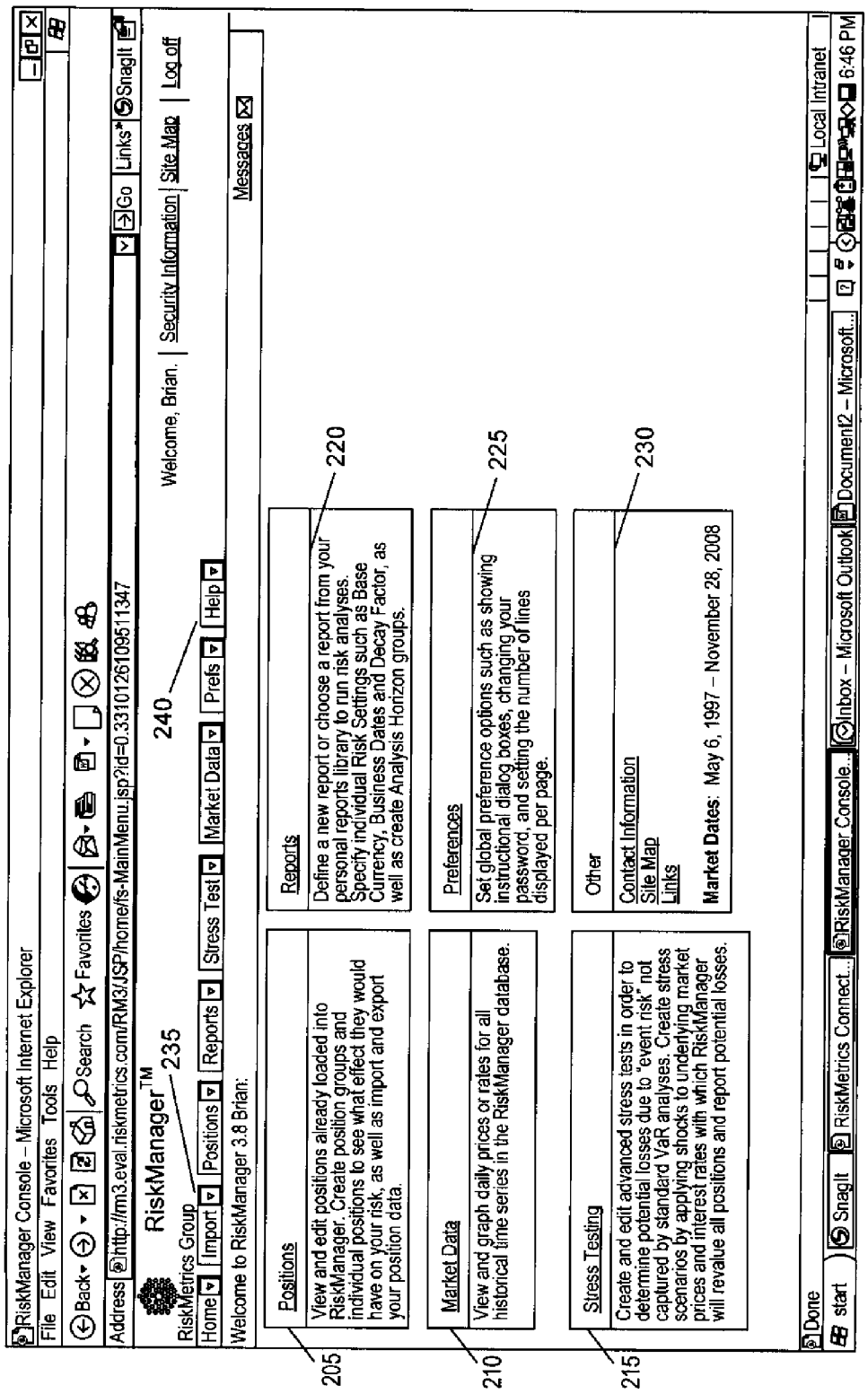
FIG. 2 depicts an exemplary main page according to an embodiment of the present invention.

FIG. 2 depicts an exemplary main page 200 according to an embodiment of the present invention. Pace 200 may include links to portions of the system that are accessible only to investors, portions that are accessible only to managers (e.g., 205), and portions that are accessible by both (e.g., 210, 215, 220, 225, 230, 235 and 240). Page 200 includes a position page link 205. Clicking on position page link 205 will direct a user's browser to a position page, which may be accessible only to managers. In some embodiments, position page link 205 is hidden when main page 200 is accessed by investors. The position page allows managers to upload, view and edit position information. Main page 200 also includes a market data page link 210, which links to a market data page. The market data page allows users to view, access and transfer historical market data (such as that maintained in market data store 125) into, out of, and within the system. Main page 200 further includes a stress testing page link 215. The stress testing page allows users to create and run stress tests that simulate stressful market conditions and analyze how a portfolio may react. Exemplary stressful conditions include, by way of non-limiting example, increases in one or more interest rates and decreases in one or more market prices. Main page 200 further includes a reports page link 220. The reports page allows users to create detailed reports based on simulated returns or other parameters. Through the reports page, users may access set-up screens for generating simulated returns and utilizing such parameters to calculate risk statistics. Main page 200 further includes a preferences page link 225. The preferences page allows users to edit administrative information such as passwords and configure display preferences. Main page 200 further includes a miscellaneous information page link 230. The miscellaneous information page includes, for example, contact information, a site map, and links to related internal and external websites. Main page 200 further includes an import page link 235. The import page allows users to upload bulk data, such as market data and portfolio position information. Main page 200 further includes a help page link 240. The help page includes information targeted at both managers and investors that is intended to assist with their usage of the system.

FIGS. 3A, 3B and 3C depict an exemplary bond position page 300 according to an embodiment of the present invention. (FIGS. 3A, 3B and 3C will collectively be referred to as "FIG. 3.") In particular, FIG. 3 depicts an exemplary position page 300 that allows a manager to enter position information regarding a generic bond. Page 300 contains the following fields, into which a manager may enter the appropriate information. Name field 302 allows a manager to enter a name for the bond whose position information is to be entered. Permission field 304 allows a manager to select whether the position information may be withheld from others, such as investors. This field may have a default value of "private," meaning that the position information is not made accessible to investors. Currency field 306 accepts the type of currency associated with the bond. Notional field 308 is for a notional (also known as "par value" or "principle") of the bond. The notional date collection of fields 310 contain more detailed information regarding the notional entered in notional field 308. Settlement date collection of fields 312 accept information that specifies when the bond settles, allowing for an explicit date or a fixed term. Value date collection of fields 314 accept information regarding the value date for the bond, including whether the date is explicitly set or determined by a fixed term, the settlement price, accrued interest for the settlement and the type of settlement period. Issue date collection of fields 316 accept information regarding the issue date of the bond, including whether the issue date is an explicit date or determined by a fixed term. Discount curve field 318 accepts discount curve information associated with the bond. Riskless curve collection of fields 320 accept information regarding the riskless curve associated with the bond. Maturity date collection of fields 322 accept maturity date information regarding the bond, including whether the maturity date is explicitly set or determined according to a fixed term. Dated date collection of fields 324 accept dated date information regarding the bond, including whether the dated date is explicitly set or determined according to a fixed term. Coupon date collection of fields 326 accept coupon date information regarding the bond, including whether the coupons may be redeemed on a set date or periodic dates. Last coupon date before maturity collection of fields 328 accept information regarding the last coupon date of the bond, such as the coupon type and whether the last coupon date follows the end-of-the-month rule. Fixed interest basis collection of fields 330 accept information regarding the bond's interest rate, if fixed. Floating interest basis collection of fields 332 accept information regarding how the bond's interest rate is calculated, if the rate floats. Such information includes the coupon's frequency, the tenor, the reference and reset frequencies, float information, floor and ceiling rates, and coupon dates. Step coupon basis collection of fields 334 accept information regarding the bond's step coupon basis. Sinking fund and amortization specification collection of fields 336 accept information regarding the bond's sink schedule, fund prices and prepay speed. Call provisions collection of fields 338 accept details regarding callable bonds, and put provisions collection of fields 340 accept details regarding putable bonds. Both collections of fields include fields where strike dates may be entered. Announced redemptions collection of fields 342 accept announced redemption information, including call and put information regarding the same. Brady bond specifics collection of fields 344 accept Brady bond details. Inflation indexed bond specifics collection of fields accept information regarding inflation-indexed bonds.

FIG. 4 depicts an exemplary credit default swap ("CDS") position page 300 according to an embodiment of the present invention. In particular, FIG. 4 depicts an exemplary position page 400 that allows a manager to enter position information regarding a CDS. Page 400 contains the following fields, into which a manager may enter the appropriate information. Position name field 405 allows a manager to enter a name for the CDS whose position information is to be entered. Permission field 410 allows a manager to select whether the position information may be withheld from others, such as investors. Notional field 415 is for a notional (also known as "principle") of the CDS. Currency field 420 accepts the type of currency associated with the CDS. Spread collection of fields 425 accept spread information associated with the CDS. Protection side type field 430 accepts protection information regarding the CDS. Maturity and settlement collection of fields 435 accept maturity and settlement amount and date information. Credit grade model inputs collection of fields accept information regarding the equity underlying the CDS.

Figure 5:
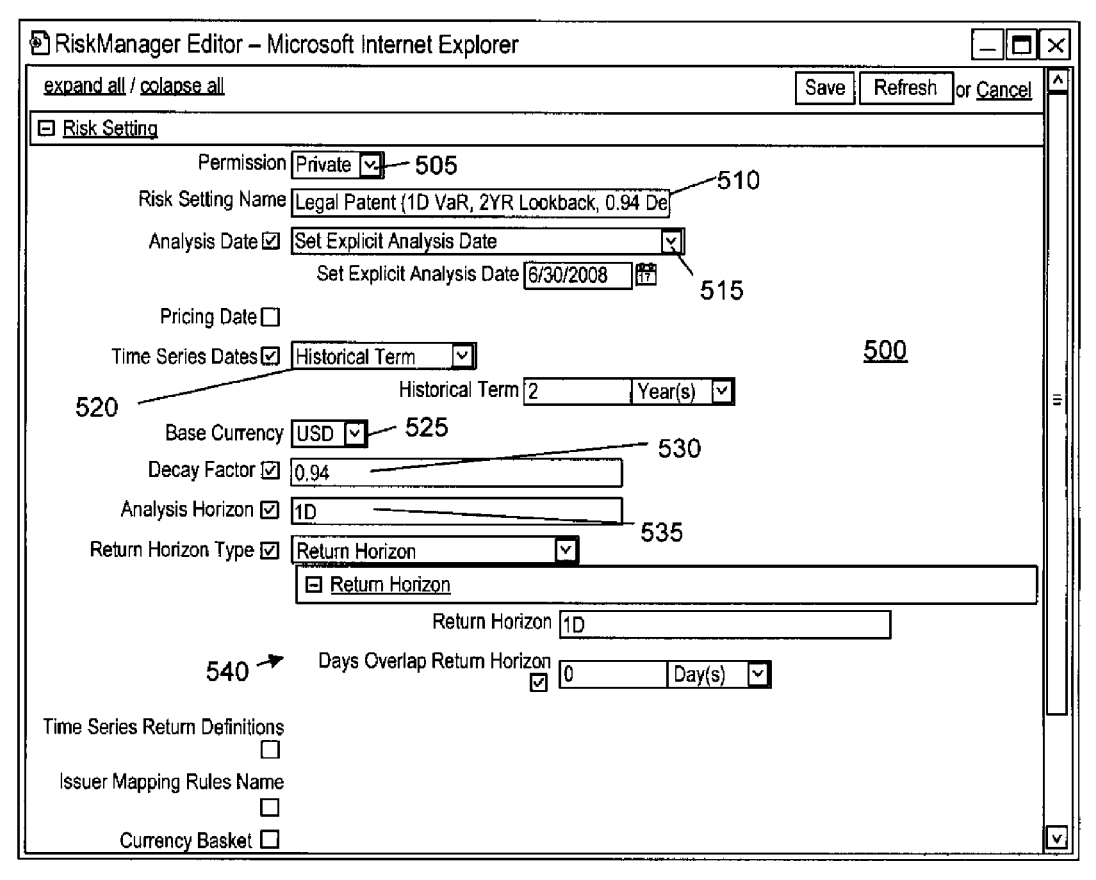

FIG. 5 depicts an exemplary Monte Carlo parameter input page 500. Investors and managers may utilize page 500 to input parameters that the system uses for a Monte Carlo simulation or portion thereof. A portion of the Monte Carlo simulation may be performed to generate a plurality of simulated returns (e.g., tens, hundreds, thousands, ten-thousands, hundred-thousands). Alternately, or in addition, the Monte Carlo simulation may be performed in its entirety in order to generate one or more other risk statistics. Page 500 includes permission field 505, which allows a manager or investor to select whether the position information may be withheld from others. Name field 510 allows a user to enter a name for the Monte Carlo simulation. Analysis date field 515 accepts an analysis date, either explicit or according to a schedule. The analysis date is the date for which the Monte Carlo simulation calculates its risk statistics. That is, the simulation calculates its predictions for the analysis date. Time series dates collection of fields 520 accept an identification of time series to be input in the Monte Carlo simulation. This information may include the parameters that are input into the associated mathematical model. The time series dates specify the term over which such parameters are taken. Base currency field 525 accepts an identification of the currency in the simulation. Decay factor field 530 accepts a decay factor to be applied to the time series data. The decay factor, know to those of ordinary skill in the art, adjusts the time series data to weight recent events more than older events. Analysis horizon field 535 accepts an analysis horizon time period. The analysis horizon time period specifies the time for which the produced risk statistics are produced (e.g., the period over which the risk exists if the calculation is a VaR). Return horizon collection of fields 540 accept return horizon information. The return horizon information indicates the sampling frequency of the returns (e.g., daily, weekly, monthly, etc.). Other selection parameters include, by way of non-limiting example, the number of simulation runs (i.e., the number of simulated returns calculated), the type of currency to report the results in, and time series start and end dates.

Figure 6:
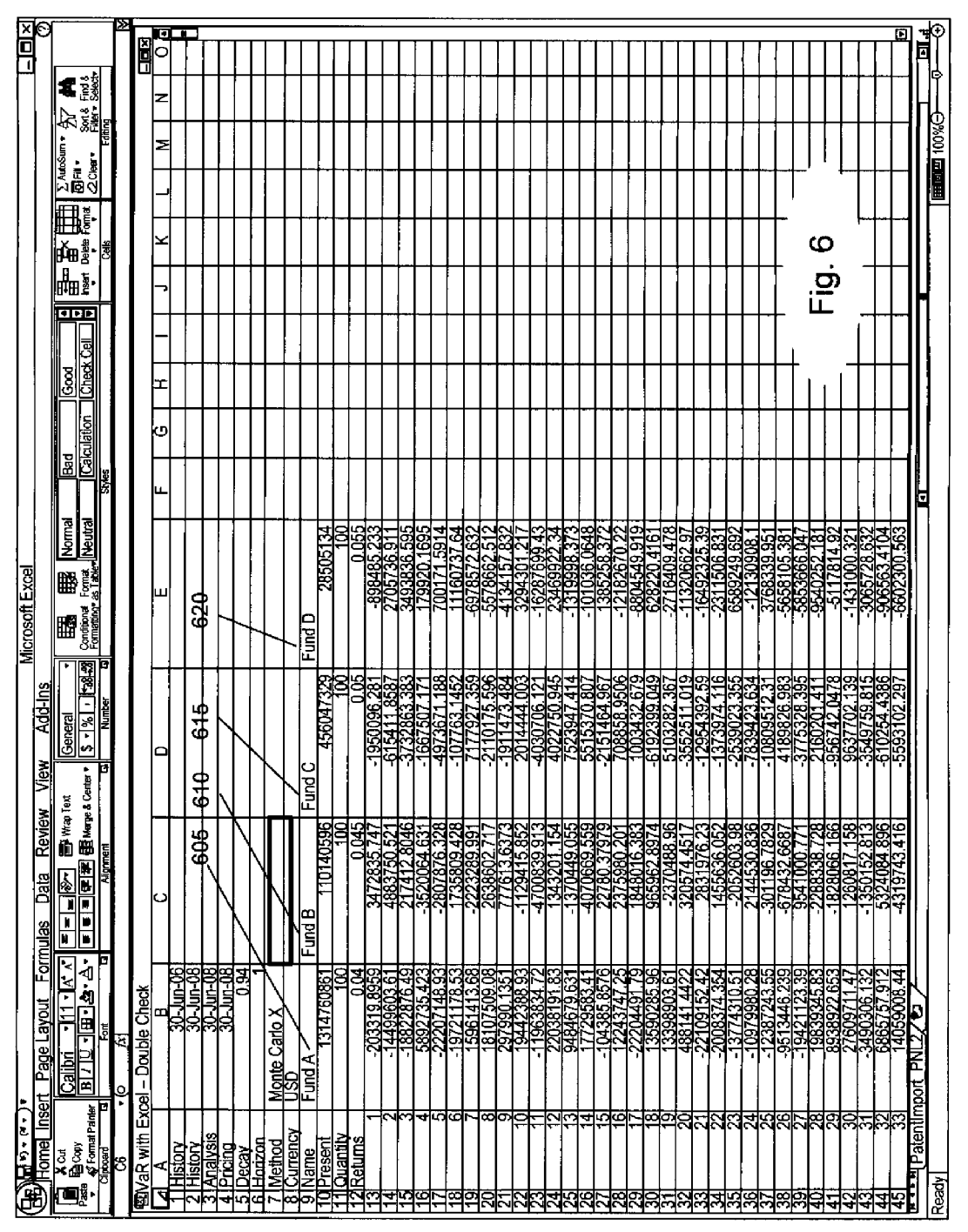

FIG. 6 depicts simulated returns produced by a portion of a Monte Carlo simulation according to an embodiment of the present invention. The portfolio under consideration contains shares from four different funds, labeled Fund A 605, Fund B 610, Fund C 615 and Fund D 620. The simulated returns of FIG. 6 are organized according to fund, although other partitions of the portfolio are possible. Fund A has a present value of about $1.31 billion, fund B has a present value of about $110 million ("M"), Fund C has a present value of about $456 M and Fund D has a present value of about $28.5 M. The simulation reflected in FIG. 6 utilizes the following parameters. The historical time series data is selected such that it starts on Jun. 20, 2006 and ends on Jun. 30, 2008, with a decay factor of 0.94. The analysis and pricing dates are set for Jun. 30, 2008. The funds are in U.S. dollars. The random variable utilized in the simulation at least partially controls what scenarios are used, in some embodiments consistent with volatility estimates and correlations. FIG. 6 depicts thirty-three of one thousand (in this instance) simulated returns for each fund according to the parameters discussed above, although many more may be calculated (up to hundreds of thousands). Accordingly, each simulated return represents the value of the particular fund shares in the portfolio on Jun. 30, 2008 as predicted using the mathematical model that employs a time series of data from Jun. 30, 2006 to Jun. 30, 2008 with a decay factor of 0.94. Note that the simulated returns vary markedly. However, the simulated returns may be used to derive a large variety of risk statistics. Moreover, the data depicted in FIG. 6 cannot be used to determine position information for the portfolio or strategy information for the portfolio. Accordingly, this data may be published or made available to investors without revealing the strategy associated with the portfolio.

Figure 7:
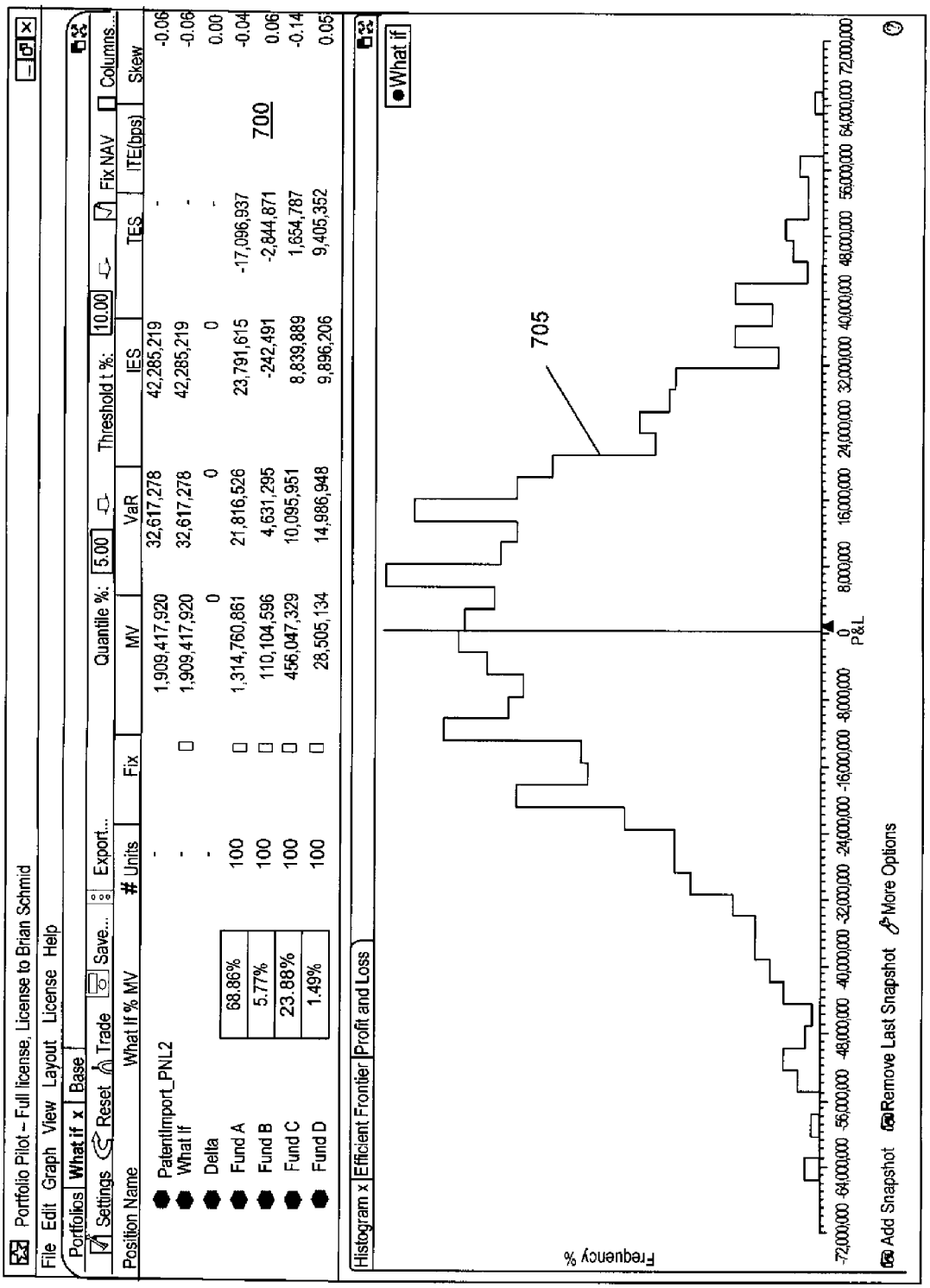
FIG. 7 depicts an exemplary report screen according to an embodiment of the present invention.

FIG. 7 depicts an exemplary report screen 700 according to an embodiment of the present invention. In particular, FIG. 7 depicts a presentation of the simulated returns reflected in FIG. 6. These data may be used to calculate a VaR from simulated returns alone, without requiring portfolio information. Note that, at a high level of generality, a VaR is associated with three parameters: a confidence level, a date and an amount. The VaR calculation accepts as inputs a confidence level and a date, and outputs an amount, such that these parameters are related as follows: the probability that the associated portfolio will lose more than the output amount by the input date is less than the input confidence level. The amount discussed in this paragraph is the VaR. Thus, VaR provides a summary of the total risk of the portfolio. In application, a VaR is also associated with the specific calculation parameters, such as the specific mathematical model used in the calculation.

Relative to FIG. 7, a discussion follows as to how a VaR may be calculated from simulated returns, without requiring position information. As discussed above, the parameters input into the calculation are a probability and a date, and the calculation will output a VaR amount. The simulated returns are calculated for the input date. That is, the simulated returns reflect the predicted value of the portfolio on the specified date. The range of the simulated returns' values is parsed into discrete buckets according to value. The simulated returns are sorted according to these buckets, such that the x-axis represents simulated return amount and the y-axis represents frequency of simulated returns with the associated x-axis value, resulting in a histogram. This histogram is normalized such that the area under the histogram is equal to one, resulting in histogram 705. Histogram 705 thus reflects the possible returns (i.e., profit or loss) of the portfolio on the date for which the simulated returns are calculated. (In some embodiments, the histogram need not be normalized.) A point on the x-axis is located such that the area under the histogram to the right of the point is equal to the input confidence level. This point located on the x-axis is the amount output by the calculation, that is, the VaR. Note that the above calculation may be performed using simulated returns, without knowledge of any position information.

In general, and by way of non-limiting example, embodiments of the present invention may withhold portfolio position information from investors. In some embodiments, any, or a combination, of the following information may be withheld from investors: identity of the holdings in the portfolio, identity of the amounts of each holding in the portfolio, identity of dates in which holdings change in the portfolio, and identity of the amounts by which holdings in the portfolio changed. The terms "holding" and "holdings" as used in the previous sentence means the smallest unit in which an investor may invest, such as particular stocks, particular bonds, particular derivatives, etc.

In general, and by way of non-limiting examples, any, or a combination, of the following instruments or asset types may be included in a portfolio according to an embodiment of the present invention: American depositary receipts ("ADR"), bonds (amortizing, callable, putable, sinking), bond futures, bond options, caps, cash, cashflow streams, collars, commodities, commodity options (average rate, double barrier, single barrier, spread) commodity futures, commodity swaps, correlation swaps, credit default swaps ("CDS"), CDS indexs, amortizing CDS, asset backed securities indexes ("ABX"), loan credit default swaps ("LCDS"), loan credit default indexes ("LCDX"), commercial mortgage-backed securities credit default indexes ("CMBX"), credit default swap option, collateralized debt obligations ("CDO"), synthetic CDOs, convertible bonds, convertible bond options, mandatory converts, double strike caps and floors, equities, equity options (average rate, double barrier, single barrier), equity futures, quanto equity futures, equity swaps, bond market association ("BMA") muni swaps, commodity basis swaps, floors, forward rate agreements, floating rate notes, floating rate agreements, foreign exchange ("FX") options (average rate, double barrier, single barrier, digital) FX forwards, generic bonds, mortgage backed securities (U.S., Danish), generic mortgage backed securities, multi-asset options, inflation indexed bonds, inflation swaps, break even inflation swaps, year-on-year inflation swaps, inflation linked swaps, interest rate futures, options on futures (bond, equity, interest rate, commodity,) money markets, mutual funds, overnight indexed swaps, securitized products (generic MBS, U.S. MBS, U.S. collateralized mortgage obligation ("CMO")), swaps, swaptions, variance swaps, range accrual notes and U.K. index-linked gilts.

Note that embodiments of the present invention may input information (e.g., position information from managers) using a variety of techniques, not limited to web-page based interfaces such as those discussed above in reference to FIGS. 3 and 4. By way of non-limiting example, an embodiment (e.g. system 100 of FIG. 1) may include a file transfer protocol ("FTP") server and an associated FTP site. Such a site and server may allow managers to upload position or other information, after which such information is treated the same as if it were entered using position input pages such as those depicted in FIGS. 3 and 4. As another example, information may be entered into the system using email. As yet another example, information may be streamed into embodiments of the invention. Other techniques for entering information are also possible. Note that the techniques of this paragraph may be employed by any user, including both managers and investors.

Further, embodiments of the present invention may output information (e.g., simulated returns, risk statistics, and reports regarding these data) according to a variety of techniques, not limited to web-page based presentations such as those discussed above in reference to FIGS. 6 and 7. By way of non-limiting example, an embodiment (e.g. system 100 of FIG. 1) may include a file transfer protocol ("FTP") server and an associated FTP site. Such a site and server may allow investors and managers to download risk statistics, simulated returns, market data, scenarios, risk factors and other data. As another example, users may request that information be sent via email. As yet another example, information may be streamed out of embodiments of the invention to interested users. Other techniques for outputting information are also possible.

According to certain embodiments of the present invention, managers input position information into a programmed computer. The computer transforms the position information according to the techniques disclosed herein into, e.g., simulated return vectors and risk statistics, which are made available to investors by, for example, visually displaying such information on a computer monitor.

The system according to embodiments of the invention or portions of the system of embodiments of the invention may be in the form of a "processing machine," such as a general purpose or special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described herein. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments of the invention may be a general purpose computer. However, the processing machine described above may also utilize any of a wide variety of other technologies including a programmed computer, a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of embodiments of the invention.

The processing machines used to implement embodiments of the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice a method according to embodiments of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of embodiments of the invention to communicate with any other entity; e.g., so as to obtain further instructions or to access and use remote memory stores. Such technologies used to provide such communication might include a network, the Internet, Intranet, Extranet, LAN, an Ethernet, or any client server system that provides communication, for example. Such communications technologies may use any suitable protocol such as TCP/IP, UDP, or OST, for example.

As described above, a set of instructions may be used in the processing according to embodiments of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of embodiments of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, e.g., to a particular type of computer. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method according to embodiments of the invention. Rather, any number of different programming languages may be utilized as is necessary or desirable.

Also, the instructions and/or data used in the practice of embodiments of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions that enables the computer operating system to perform the operations described above may be contained on any of a wide variety of media or medium, as desired. Further, the data that is processed by the set of instructions might also be contained on any of a wide variety of media or medium. That is, the particular medium or memory in the processing machine, utilized to hold the set of instructions and/or the data used in embodiments of the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of embodiments of the invention.

Further, the memory or memories used in the processing machine that implements embodiments of the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method according to embodiments of the invention, a variety of user interfaces may be utilized to allow a user to interface with the processing machine or machines that are used to implement embodiments of the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method according to embodiments of the invention, it is not necessary that a human user actually interact with a user interface used by the processing machine. Rather, it is also contemplated that the user interface according to embodiments of the invention might interact, convey and receive information, with another processing machine, rather than a human user. Accordingly, the other processing machine might be characterized as a user. Further, it is contemplated that a user interface utilized in the system and method according to embodiments of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof without departing from the substance or scope of the invention.

Other embodiments, uses, and advantages of the present invention will be apparent to those skilled in the art from consideration of the specification and practice of the present invention disclosed herein. The specification and drawings should be considered exemplary only, and the scope of the present invention is accordingly intended to be limited only by the following claims and equivalents thereof.

We claim:

1. A computer implemented system of providing risk information of a plurality of portfolios to an investor without revealing positions in the plurality of portfolios, wherein at least one portfolio of the plurality of portfolios is controlled by one or more portfolio managers, the system comprising:
   one or more computer processors;
   a computer; and
   a communication network communicatively coupling the one or more computer processors and computer to perform the following:
   calculate, by an analytical engine executed by the one or more computer processors, a plurality of simulated returns for a portfolio, wherein the simulated returns were calculated based on a deterministic set of scenario parameters;
   calculate, by the analytical engine, a non-aggregatable risk statistic for the portfolio based on the simulated returns and for one or more other portfolios, without receiving positions in the portfolio and without receiving positions in the one or more other portfolios; and
   provide the investor access, via the computer, to the plurality of simulated returns, the deterministic set of scenario parameters, and the non-aggregatable risk statistic calculated by the analytical engine, wherein the computer is configured to prevent access to position information reflecting contents of the portfolio and the one or more other portfolios, and wherein the analytical engine and the computer do not receive position information in the portfolio and do not receive position information in the one or more other portfolios.

2. The system of claim 1, wherein the non-aggregatable risk statistic is a value at risk or an expected shortfall.

3. The system of claim 1, wherein the non-aggregatable risk statistic is selected from a group of simulation based statistics.

4. The system of claim 1, wherein at least one of the deterministic set of scenario parameters is generated using a pseudorandom number generator.

5. The system of claim 1, wherein the simulated returns are received from the one or more portfolio managers.

6. The system of claim 1, further comprising another computer configured to present a screen that provides the investor with access to a definition of a technique used to calculate the plurality of simulated returns wherein the another computer is communicatively coupled to the computer.

7. The system of claim 1, further comprising another computer configured to present a screen to the investor that provides the investor with access to the deterministic set of scenario parameters.

8. The system of claim 1, wherein the computer is configured to present a web page to the investor, the web page providing the investor the access to the plurality of simulated returns.

9. The system of claim 1, wherein the one or more processors and the computer are the same computer.

10. The system of claim 1, wherein the one or more processors and the computer are at different locations.

11. The system of claim 1, wherein the non-aggregatable risk statistic value is calculated as the same value as if the investor had full access to detailed position information, without revealing the detailed position information.

12. A computer implemented method of providing risk information of a plurality of portfolios to an investor without revealing positions in the plurality of portfolios, wherein at least one portfolio of the plurality of portfolios is controlled by one or more portfolio managers, the method comprising:
   calculating, by an analytical engine executed by one or more computer processors, a plurality of simulated returns for a portfolio, wherein the simulated returns were calculated based on a deterministic set of scenario parameters;
   calculating, by the analytical engine, a non-aggregatable risk statistic for the portfolio based on the simulated returns and for one or more other portfolios, without receiving positions in the portfolio and without receiving positions in the one or more other portfolios; and
   providing the investor access, via a computer, to the plurality of simulated returns, the deterministic set of scenario parameters, and the non-aggregatable risk statistic calculated by the analytical engine, wherein the computer is configured to prevent access to position information reflecting contents of the portfolio and the one or more other portfolios, and wherein the analytical engine and the computer do not receive position information in the portfolio and do not receive position information in the one or more other portfolios.

13. The method of claim 12, wherein the simulated returns are further calculated based on the position information.

14. The method of claim 13, wherein the analytical engine is located on a premises of one of the one or more portfolio managers.

15. The method of claim 13, wherein the analytical engine is located on a premises of a third party.

16. The method of claim 12, wherein the non-aggregatable risk statistic is a value at risk or an expected shortfall.

17. The method of claim 12, wherein the non-aggregatable risk statistic is selected from a group of simulation based statistics.

18. The method of claim 12, wherein at least one of the deterministic set of scenario parameters is generated using a pseudorandom number generator.

19. The method of claim 12, wherein the step of providing the investor access, via the computer, to the plurality of simulated returns, the deterministic set of scenario parameters, and the non-aggregatable risk statistic calculated by the analytical engine, comprises serving the investor a web page.

20. The method of claim 12, further comprising providing the investor access to the analytical engine.

21. The method of claim 12, wherein the non-aggregatable risk statistic value is calculated as the same value as if the investor had full access to detailed position information, without revealing the detailed position information.

* * * * *

UNITED STATES PATENT AND TRADEMARK OFFICE
CERTIFICATE OF CORRECTION

| | | |
|---|---|---|
| PATENT NO. | : 8,924,274 B2 | Page 1 of 1 |
| APPLICATION NO. | : 12/331919 | |
| DATED | : December 30, 2014 | |
| INVENTOR(S) | : Brian Schmid et al. | |

It is certified that error appears in the above-identified patent and that said Letters Patent is hereby corrected as shown below:

On the title page, item (54) and in the specification, col. 1, line 1, should read as follows:

-- SYSTEM FOR AND METHOD OF PROVIDING PORTFOLIO RISK INFORMATION TO INVESTORS WITHOUT REVEALING POSITION INFORMATION --.

Signed and Sealed this
Fifth Day of May, 2015

Michelle K. Lee
*Director of the United States Patent and Trademark Office*